UNITED STATES PATENT OFFICE.

LOUIS ENRICHT, OF CHICAGO, ILLINOIS, ASSIGNOR TO THE UNITED STATES DUROLITHIC COMPANY, OF WEST UNION, IOWA.

MANUFACTURE OF ARTIFICIAL STONE.

SPECIFICATION forming part of Letters Patent No. 486,445, dated November 22, 1892.

Application filed December 15, 1891. Serial No. 415,181. (No specimens.)

*To all whom it may concern:*

Be it known that I, LOUIS ENRICHT, a citizen of the United States, residing at Chicago, in the county of Cook and State of Illinois, have invented a certain new and useful Improvement in the Manufacture of Artificial Stone, (Case No. 1,) of which the following is a full, clear, concise, and exact description.

My invention relates to a process and a composition of matter for the manufacture of artificial stone or cement, with magnesium as a basis.

The process which I prefer to practice in making my product is as follows: I dissolve egg-albumen in water in the proportion of four ounces of the former to twenty ounces of the latter. For the purpose of preventing the coagulation of the egg-albumen I acidify it with dilute hydrochloric acid by the process of osmose, by which means the egg-albumen is not coagulated and is rendered non-coagulable. The process of osmose consists of putting the solution of egg-albumen in a parchment vessel, which is suspended in another vessel containing dilute hydrochloric acid and leaving it there for the period of forty-eight to sixty hours, after which the egg-albumen is removed, leaving the hydrochloric acid in the outer vessel, ready to acidify another batch of egg-albumen. This acidified egg-albumen of the amount above stated I add to fifty pounds of magnesium oxide and three gallons of solution of magnesium chloride of at least 20° Baumé and thoroughly stir these ingredients together, after which I add sand, sawdust, gravel or other inert substance to suit the requirements for which the product is to be used in the proportion of from one to twenty times the amount of sand or other substance to one of the mixture of acid albumen, magnesium oxide, and magnesium chloride. The resulting product is in a plastic state and can be brought as near to a fluid state as is desirable by the addition of water. This mass can be cast in molds in any form or manner or can be used like plaster on walls or other surfaces and will crystallize and become hard in from four to twenty-four hours, according to the temperature. The warmer the temperature the quicker the mass will harden.

I have mentioned the proportions of magnesium chloride and magnesium oxide which I preferably use; but these proportions may be varied without serious detriment to the resulting product, so that the exact proportions of these ingredients are not an essential part of my invention.

The important object to be secured in the manufacture of artificial stone is resistance to the attacks of the elements. It is a well-known fact that artificial magnesium stone, which in other respects answers most satisfactorily the requirements of a stone for a great variety of uses, is attacked by carbonic-acid gas in the atmosphere when such stone is in a moist condition. This fact renders what would otherwise be a very valuable product of no commercial value. It is to eliminate the hygroscopic quality of the magnesium stone that I have invented the hereinbefore described process and composition of matter. In commercial magnesium oxide calcium oxide or lime is always present to some extent. In mixing magnesium oxide with magnesium chloride, as it is necessary to do in the manufacture of artificial magnesium stone, a certain amount of calcium chloride is formed from the calcium oxide present in the magnesium oxide and the hydrochloric acid in the magnesium chloride. This resulting salt—chloride of calcium—is highly hygroscopic, and it is the presence of this hygroscopic salt in magnesium stone which causes the stone to remain continually moist, and thus subject to the attack of carbonic-acid gas. The mixture of acid albumen, as above described, effectually counteracts the influence of the chloride of calcium, for the acid albumen combines chemically with the lime, forming a hard, strong, and insoluble cement—an albuminate of lime. The acid albumen also combines chemically with the magnesium, forming albuminate of magnesium, which is insoluble and not attacked by carbonic acid. Moreover, the acid albumen, by combining with the mass mechanically and intimately, gives it homogenity and renders it impervious to moisture and adds great resisting power against the attacks of heat, frost, and other atmospheric and climatic influences.

For the different purposes for which my product is designed to be used I add to the oxychloride-magnesium-acid-albumen mixture such mineral or other substances as are best adapted—as, for instance, for coarse stone I use coarse unsifted sand, and for finer and more compact stone I use finely-sifted sand, flint, or an admixture of sand, flint, and kaolin. For the imitations of different-colored marbles I use the finest white sand and the necessary earthen or mineral pigments to color the same. For pavements and floor-covering I use ashes or an admixture of gravel and sand. For filling-brick I use sawdust as the inert admixture.

Having thus described my invention, what I claim as new, and desire to secure by Letters Patent, is—

1. The process of making cement, which consists of mixing non-coagulable albumen with oxychloride of magnesium in a plastic state and while the same is still plastic adding thereto inert material, whereby the cement is rendered non-hygroscopic.

2. The herein-described composition of matter for the production of artificial stone, consisting of non-coagulable albumen, magnesium oxide, magnesium chloride, and an inert substance, substantially in the proportions specified.

In witness whereof I hereunto subscribe my name this 12th day of December, A. D. 1891.

LOUIS ENRICHT.

Witnesses:
CHARLES A. BROWN,
GEORGE L. CRAGG.